(12) United States Patent
Snell et al.

(10) Patent No.: US 9,664,108 B1
(45) Date of Patent: May 30, 2017

(54) CRANK MECHANISMS FOR ASYMMETRICAL NON-SINUSOIDAL PISTON MOTION PROFILES IN OPPOSED PISTON INTERNAL COMBUSTION ENGINES

(71) Applicants: William Snell, Monmouth, OR (US); Sean Kirkpatrick, Corvallis, OR (US)

(72) Inventors: William Snell, Monmouth, OR (US); Sean Kirkpatrick, Corvallis, OR (US)

( * ) Notice: Subject to any disclaimer, the term of this patent is extended or adjusted under 35 U.S.C. 154(b) by 139 days.

(21) Appl. No.: 14/608,186

(22) Filed: Jan. 28, 2015

Related U.S. Application Data

(60) Provisional application No. 61/932,443, filed on Jan. 28, 2014.

(51) Int. Cl.
| | | |
|---|---|---|
| *F02B 75/24* | (2006.01) | |
| *F02B 75/22* | (2006.01) | |
| *F02B 25/08* | (2006.01) | |
| *F02B 75/28* | (2006.01) | |
| *F16H 21/18* | (2006.01) | |
| *F02B 75/02* | (2006.01) | |
| *F01B 7/14* | (2006.01) | |

(52) U.S. Cl.
CPC ........... *F02B 75/282* (2013.01); *F16H 21/18* (2013.01); *F01B 7/14* (2013.01); *F02B 75/246* (2013.01); *F02B 2075/025* (2013.01)

(58) Field of Classification Search
CPC .. F02B 75/28; F02B 2075/025; F02B 75/246; F02B 75/282; F01B 7/14; F01B 9/026; F01B 9/023; F16H 21/18

USPC ...... 123/51 BA, 53.2, 55.2, 55.5, 55.7, 53.3, 123/59.6
See application file for complete search history.

(56) References Cited

U.S. PATENT DOCUMENTS

| | | | | |
|---|---|---|---|---|
| 3,209,736 A | * | 10/1965 | Witzky ..................... | F01B 7/12 123/48 R |
| 5,042,441 A | * | 8/1991 | Paul ......................... | F01B 7/14 123/257 |
| 5,133,306 A | * | 7/1992 | Honkanen ................. | F01B 7/02 123/51 AA |

(Continued)

*Primary Examiner* — Carlos A Rivera
*Assistant Examiner* — Syed O Hasan
(74) *Attorney, Agent, or Firm* — Patent Ingenius LLC; Scott Evan Gilbert

(57) ABSTRACT

A dual crank mechanism is introduced for controlling and optimizing asymmetry in the motion profile of at least one piston of an opposed piston internal combustion (OPIC) engine piston pair. The dual crank mechanism produces a substantially asymmetrical non-sinusoidal, but periodic, reciprocating motion profile of the right-hand piston. A single crank mechanism is also introduced for controlling non-sinusoidal, but mostly symmetric, piston motion profile for one or both pistons of an opposed piston pair. The two novel crank mechanisms may be advantageously used exclusively or in combination in order to optimize the piston motion in a novel high efficiency OPIC engine having an externally mounted combustion chamber, an external compressing means for injecting compressed fuel mixtures directly into the external combustion chamber, and reducing cylinder porting to a single exhaust port per cylinder due to improved scavenging resulting from the asymmetric non-sinusoidal piston profiles produced by the novel crank mechanisms.

6 Claims, 9 Drawing Sheets

(56) References Cited

U.S. PATENT DOCUMENTS 5,133,314 A * 7/1992 Langstroth .............. F16H 21/30
123/197.1

* cited by examiner

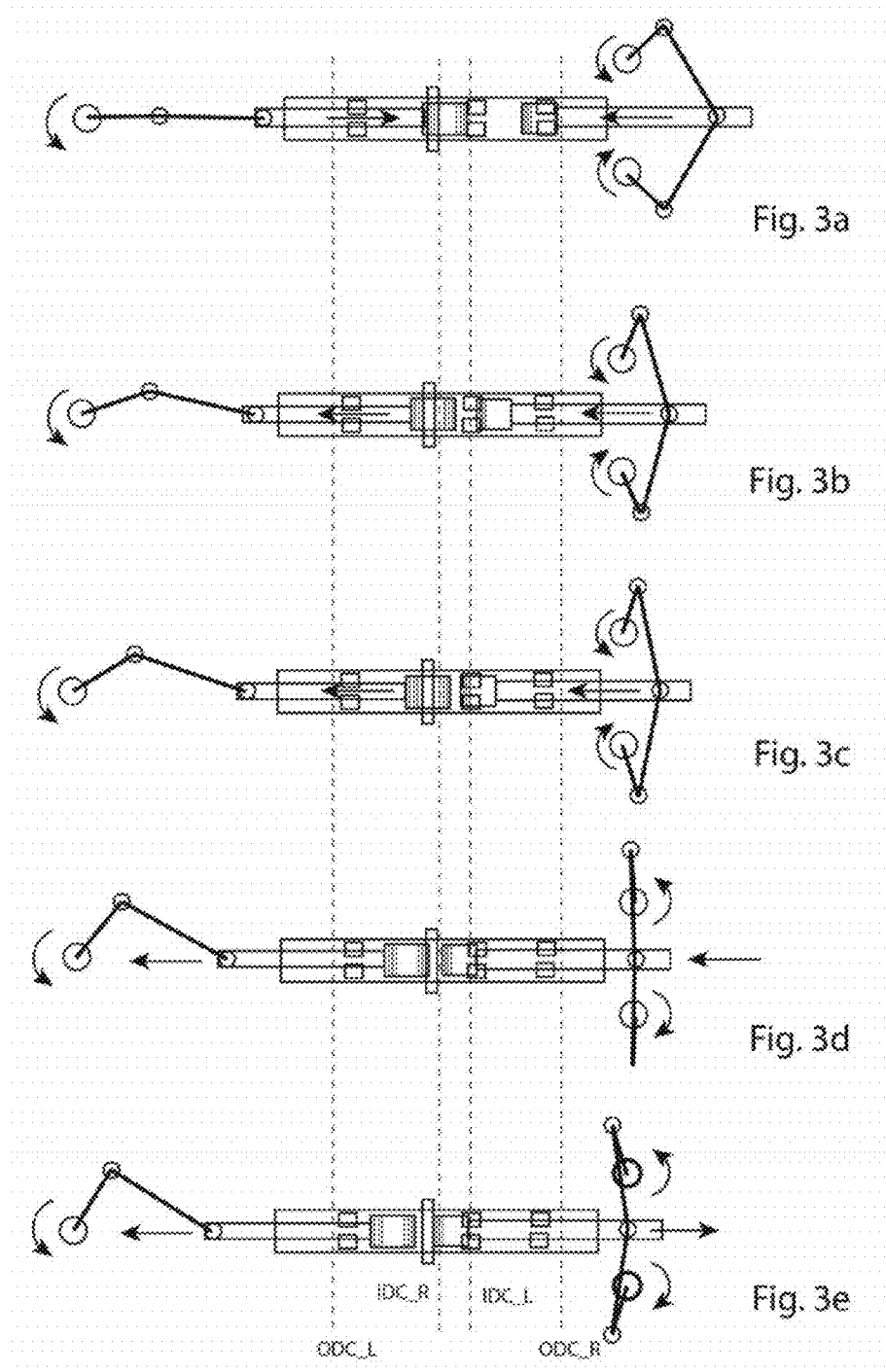

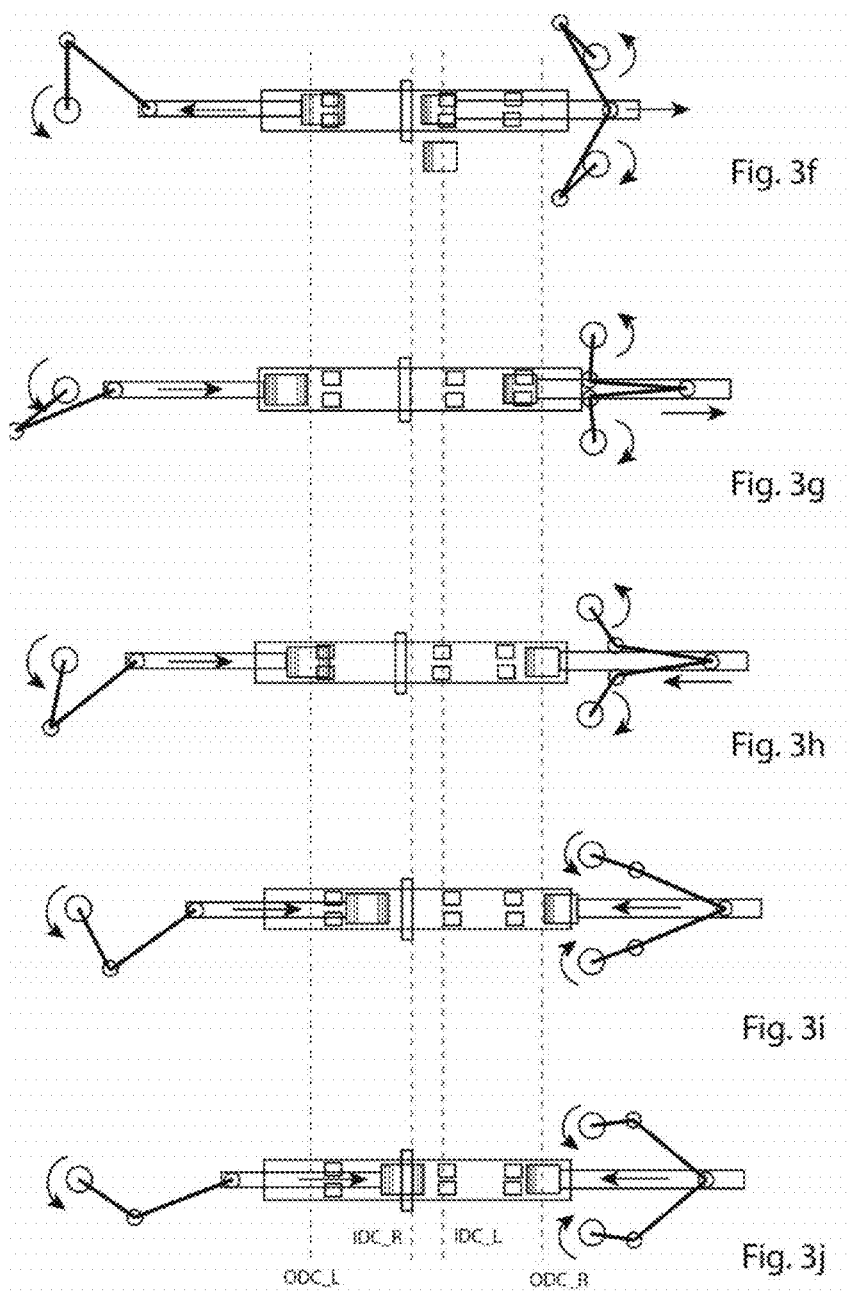

CRANK MECHANISMS FOR ASYMMETRICAL NON-SINUSOIDAL PISTON MOTION PROFILES IN OPPOSED PISTON INTERNAL COMBUSTION ENGINES

CROSS REFERENCE TO PRIORITY APPLICATIONS

This non-provisional Patent Application claims the benefit of U.S. Provisional Application No. 61/932,443, filed on Jan. 29, 2014; 61/933,575, filed on Jan. 31, 2014; 61/933,830, filed on Feb. 2, 2014; 61/934,833, filed on Feb. 2, 2014; 61/934,834, filed on Feb. 2, 2014; 61/934,841, filed on Feb. 2, 2014; 61/934,842, filed on Feb. 2, 2014; and 61/934,844, filed on Feb. 2, 2014.

FIELD OF THE INVENTION

This disclosure relates to opposed piston internal combustion engines, specifically their designs and methods of operation

SUMMARY OF THE DISCLOSURE

This disclosure describes a novel opposed piston internal combustion (IC) engine piston motion control system and method, wherein the novel engine comprises one or more cylinders arranged in a barrel configuration or in a rectilinear configuration. Each cylinder of the inventive engine houses an opposed piston pair. Each piston comprises a piston head affixed to a piston rod, wherein each piston rod extends axially (substantially parallel to the cylinder axis) to the opposite open ends of the cylinder. In the preferred embodiment, the piston rods are coupled to separate crank mechanisms that produce unique motion profiles governing the motion of each piston. In the preferred embodiment, an external combustion chamber is mounted on the exterior wall of at least one of the one or more cylinders of the inventive engine, wherein the external combustion chamber is preferably located substantially at the center of the opposed piston cylinder, at or near the midway point between the two ends of the cylinder. The external combustion chamber communicates with the cylinder volume via an exit extending through the cylinder wall. The preferred embodiment of the novel engine further comprises at least one external compression means to provide a charge of compressed air or other working fluid, such as argon/air mixtures, or pre-mixed working fluid/fuel charges to the external combustion chambers. During operation of the innovative engine, the external combustion chamber's exit orifice opening is periodically blocked during the engine cycle by at least one of the opposed pistons to confine pre-combustion and combustion gases before, during and just after fuel ignition into the external combustion chamber. The external combustion chamber may be adapted to present a near adiabatic barrier to the transfer of heat generated by combustion processes occurring in its interior. Preferably, the exit orifice remains blocked by the pistons until fuel combustion has completed to substantially the maximum thermodynamic extent within the confines of the external combustion chamber, after which time the piston moves past the exit orifice and the burned combustion gases are released into the cylinder volume at or near peak combustion pressure.

In the instant innovation, the reciprocating motion timing of each piston in an opposed piston pair is independently controlled so that the motion profiles are synchronized with the fuel injection and ignition timing. The exit orifice of the external combustion chamber may be temporarily blocked by at least one of the moving pistons for at least the duration of the combustion process until the combustion is substantially complete. Furthermore, the combustion gases expand into a small but growing cylinder volume as the two pistons continue to travel in opposite directions towards the cylinder ends.

The inventive engine further comprises a first crank mechanism disposed at a first end of each of the at least one engine cylinder, coupled to a first piston of the opposed piston pair and a second crank mechanism disposed at a second end of the engine cylinder coupled to a second piston of the opposed piston pair. The first crank mechanism comprises a single crankshaft having only a primary rotational axis about which a crank arm rotates. The crank arm length defines the crank radius, or throw. In a conventional engine, a piston rod may be directly connected to a crank pin disposed at the distal end of the crank arm. In the inventive engine disclosed herein, an intervening connecting arm linkage connects the crank arm and the piston rod. The intervening connecting arm linkage may also articulate with both the crank arm about a crank pin, and with the piston rod at the articulating joint. In conventional engines, the piston rod articulates with the piston head about a connector pin, and pivots over a small angle when the piston reciprocates in the cylinder such that the piston rod does not butt up against the cylinder wall during engine operation. The crank radius or throw must also be small enough to prevent a wide pivot angle or swing of the piston rod to avoid contact with the cylinder wall. As a result, the piston motion in a conventional engine is substantially sinusoidal since the piston rod follows the circular path of the crankpin with little deviation. In the preferred embodiment and all embodiments described herein, the piston rod is distinguished from the afore-mentioned connection arm linkage. The piston rod is integral with the piston, and may extend from the interior of the piston head. The rod may articulate with the piston head or be rigidly affixed, but if articulating, its pivot angle may remain small enough to avoid contact with the cylinder wall. In the disclosed engine, the piston rod may be long enough to extend well beyond the end of the cylinder, permitting the connecting arm linkage to be attached to the piston rod outside of the cylinder by an articulating coupling means. Since the connecting arm linkage may be free of confinement by the cylinder wall or other containments, its degree of rotation about its pivot point on the piston rod is not significantly constrained. Because of the rotational freedom of the connecting arm linkage, the crank throw may be larger than standard automotive crankshafts. The combination of a large crank radius, and proportionately long intervening connecting arm linkage, may produce a substantially non-sinusoidal reciprocating linear motion of a coupled piston, since the piston is decoupled from the purely circular path taken by the crankpin by the pivot points of the connecting arm linkage. The added rotational angles introduced by these pivot points result in compounding sinusoidal motions of all articulating couplings. The compound motion may be described mathematically as the sum of sine and cosine functions, as is done in the Detailed Description.

A second crank mechanism disposed on a second end (opposite of the first end) of the engine cylinder, and coupled to the second piston of the opposed piston pair. The second crank mechanism comprises two crankshafts coupled to the second piston via two connecting arm linkages that may be connected at the same point on the piston rod. The two individual crankshafts of the second crank mechanism may be substantially the same as the first (single) crankshaft described above. This mechanism is henceforth referred to as the dual crank mechanism. In the dual crank mechanism, the two crankshafts are offset on opposite sides of the cylinder axis. These crankshafts work in tandem to transform the linear piston motion to rotational motion and transfer it to the drive train. The offset from the cylinder axis may be equidistant for each crankshaft. The crankshaft offset adds an asymmetry to the non-sinusoidal motion contribution of the connecting arm linkage. While only one offset crankshaft is sufficient to produce this asymmetric motion, push and pull forces normal to the piston axis may result in excess vibration and noise, as well as lateral stresses on the piston and cylinder wall. Therefore, providing a second crankshaft on the opposite side of the cylinder axis may balance the engine, thus eliminating vibrations and stresses. The novel engine provides the advantage of adjusting the crank arm lengths and offset distances to optimize the piston motion profile so that the speed of the piston strokes may be optimized. As will be shown below, the motion profiles of the two pistons of an opposed piston pair of the inventive engine are correlated in an asymmetrical fashion that is facilitated by the employment of the articulating linkages. The speed of the each piston varies in a non-sinusoidal fashion.

In another embodiment of the innovation, the engine comprises two dual crank mechanisms disposed at both ends of the engine cylinders. Because the engine is configured in an opposed piston arrangement, the position of the pistons within the common cylinder may be best described by replacing the jargon "top dead center" (TDC) and "bottom dead center" (BDC), commonly used and understood in the art, with "inner dead center" (IDC), and "outer dead center" (ODC). The IDC relates to the position of the piston at its closest distance to the center of the cylinder, and the ODC relates to the position of the piston at its furthest distance from the center of the cylinder. The IDC and ODC are also the extremes of the piston motion trajectories within each half of the cylinder. For the purposes of this disclosure and as described in detail below, the individual piston motion of a given piston pair are asymmetrical, and may reach their respective IDC and ODC independently at different times within the engine cycle.

It is an important object of the innovation to operate the engine at a very high thermal efficiency. To this end, the disclosed engine further comprises an external combustion chamber disposed on the exterior wall of the cylinder in the vicinity of the inner dead center (IDC) position of the pistons. The external combustion chamber may be constructed in such a way that it provides a nearly adiabatic heat barrier for constant volume combustion, thereby retaining nearly all of the heat of combustion of an ignited fuel charge. The separate crank mechanisms taught in this disclosure provide for asymmetric opposed piston travel that is optimized for combustion occurring in an external chamber, where the combustion chamber is mounted on the exterior of the cylinder wall at or near the midway point between the ends of the cylinder. The chamber volume communicates with the cylinder interior volume through an exit orifice of the combustion chamber, extending through the cylinder wall. Ignition of the fuel mixture is timed to occur when the combustion chamber exit orifice is blocked by at least one of the pistons of the opposed piston pair for a sufficient time to allow the combustion process to burn the fuel mixture to completion. Combustion gases are released into the cylinder volume between the opposed pistons near peak temperature and pressure of the combustion gases before expanding into the cylinder volume. Preferably, the innovative asymmetric dual crank mechanism is configured to provide that one of the pistons covers the exit orifice just before, during and just after dwelling at its IDC when the piston is advancing (towards IDC), stationary, and then receding (towards ODC), respectively, during which time the combustion chamber is isolated. The injected fuel mixture is then ignited (by spark or compression), and maximum combustion may proceed quickly enough to complete before the piston head recedes past the exit orifice. When the piston recedes past this point, combustion gases may be released near peak pressure into an initially small but growing cylinder volume.

Another object of the instant innovation is to mitigate or eliminate post-combustion thermal losses of the exhaust gases escaping from the external combustion chamber into the cylinder, in order to maximize thermal efficiencies. Expansion of combustion gases into a small cylinder volume circumvents efficiency losses due to a sudden depressurization of the gases that would otherwise happen if the cylinder volume were large. For the purposes of this disclosure, the cylinder volume is defined as the volume between piston crowns, and as is obvious, cyclically expands and shrinks during the engine cycle. For the purposes of this disclosure, the cylinder volume may be described in terms of the combustion chamber volume. In the preferred embodiment, it is understood that the cylinder volume, at the time of combustion gases are released into the cylinder, is a fraction of the combustion chamber volume, or may equal the combustion chamber volume.

Once released into the cylinder, the expanding gases may encounter a piston already in motion, receding towards the outer dead center (ODC) position (analogous to bottom dead center, or BDC, designation, as explained above). Such piston motion timing advantageously retards combustion gas release by several crank angle degrees from IDC (analogous to TDC, see above) so that gases at peak pressure and temperature are released into the cylinder while at least one piston is in motion receding from IDC. At this position, the cylinder volume may be a fraction of the combustion chamber volume, as explained above. This timing reduces or eliminates the pressure-volume loss when the combustion gas pressure expends some of its energy to accelerate the piston from a state of rest or low velocity (inertia).

As alluded to previously, the novel asymmetrical non-sinusoidal opposed piston motion taught in this disclosure provides a unique means to obtain the maximum possible thermal efficiency for the engine. A non-sinusoidal piston profile, particularly an asymmetric non-sinusoidal piston profile, makes possible a hyper-rapid (defined below) expansion stroke, combined with an arbitrarily rapid and/or slow scavenging stroke in the engine cycle. A fast expansion stroke is beneficial for increasing the thermal efficiency of any engine, particularly for a long expansion stroke. Very rapid piston expansion, occurring on a time scale on the order of the heat transfer time constant, permits combustion gases to cool by adiabatic expansion more quickly than any convective/conductive/radiative heat transfer through the cylinder surfaces. This is particularly the case for a long expansion stroke, where very hot combustion gases may adiabatically cool by a factor of two or more in the first 10-20% of the expansion stroke length, at the top of the stroke. In conventional engines, such as conventional Otto and Diesel cycle engines, these conditions are not possible. Purely sinusoidal piston motion encountered in conventional engines includes a significant dwell at top dead center (TDC), and a slow acceleration on the short power stroke, permitting large heat losses through the engine block. Combustion heat loss is also problematic for most sinusoidally-driven opposed piston engines, even with long expansion strokes, where piston dwell at IDC is common, and expansion is slow initially. Heat loss through the cylinder wall may be exacerbated by slow combustion times (timing loss) extending well into the expansion stroke.

Efforts to create non-sinusoidal piston motions in opposed piston engines, both symmetrical and asymmetrical, have relied on the use of gear trains, cam plates, swash plates, and special linkages. The motivation to introduce the non-sinusoidal motion in opposed piston engines has been in several cases to improve scavenging in these engines, and to improve thermal efficiencies by introducing a steeper expansion stroke compared to the compression stroke. These mechanisms are in some cases quite complex, and in some cases have been known to introduce a new set of mechanical problems that tend to counteract any gains wrought by the technology. In contrast, the inventive asymmetrical crank system accomplishes the same goal with the use of simple crankshafts and linkages, which are well known and understood in the art.

It is a further object of the disclosed engine to maintain as small as possible the cylinder volume, defined as the gap between piston faces, at the moment combustion gases are released from the external combustion chamber into the cylinder, when the exhaust gases are at or near their peak pressures and temperatures. If the piston gap at the moment the exhaust gases are released from the combustion chamber at the top of the expansion stroke is such that the cylinder volume is large with respect to the combustion volume, the gases released into the large cylinder volume will undergo sudden depressurization. It will be shown below that after the scavenging stroke is complete, the pistons movement is coordinated to continue so that exhaust gases are released into a small by growing cylinder volume. By releasing the gases as the blocking piston recedes past the exit orifice opening when the scavenging piston in close proximity a small but growing cylinder volume is formed, where the exhaust gases may enter the space between the pistons at or near peak pressures and temperatures. Under these conditions, the opposed pistons may be subjected to pressures substantially near peak combustion pressure of the exhaust gases at the beginning of the expansion stroke. The gases may then smoothly expand as fast as the gap between the pistons increases as the pistons move apart in response to the combustion gas pressure profile along the cylinder, and the maximum amount of pressure-volume work can be extracted from the combustion gases by this process because a) the pressure at the top of the expansion stroke is near peak combustion pressure, and b) the expansion stroke is rapid enough to mitigate convective and conductive heat transfer via cylinder surfaces to the point where the expansion stroke is near-adiabatic.

It is a further object of the disclosed engine to improve the scavenging efficiency over earlier opposed piston engine designs, and as a corollary, it is also an aspect of the preferred embodiment to provide only a single port on a first half of the opposed piston cylinder and two ports on a second half of the opposed piston cylinder, to facilitate scavenging efficiencies approaching 100%. According to the disclosures of U.S. Provisional Application Nos. 61/934,830 and 61/934,833 incorporated herein in their entirety, the disclosed inventive engine may be designed to operate with an external compression means. The need for an intake port is therefore obviated, as well as the need for an intake and compression stroke. According to the instant disclosure, both opposed pistons of each of the one or more piston pairs within each cylinder of the inventive engine have independent non-sinusoidal motion when traveling in the common cylinder.

In its preferred embodiment, the inventive asymmetric crank system comprises a single crank mechanism coupled to a first piston of the opposed piston pair of each cylinder, and a dual crank mechanism of coupled to a second piston of the opposed piston pair of each cylinder. Accordingly, the motion profiles of both pistons to either crank mechanism is non-sinusoidal and may be symmetric with respect to the extrema in the profile (see discussion below). As will be discussed and shown below in greater detail, the motion of the piston driven by the dual crank mechanism of the inventive compound crank may in general have a more complex profile than its mate in the opposed piston pair, comprising a larger degree of distortion and departure from a pure sinusoid. The degree of asymmetry and departure from sinusoidal motion is realized and controlled by the relative lengths of the crank arms and linkages. Therefore, the innovative compound crank design facilitates optimization of a wide range of opposed piston motion profiles. Advantageously, the asymmetry of opposed piston motion induced by the arrangement of the innovative compound crank system facilitates the optimization of operation of the innovative opposed piston engine comprising an external combustion chamber disposed on the outside of the cylinder.

In this vein, the individual piston motions to be coordinated so that the combustion is timed to occur while the exit orifice of the external chamber is blocked by one of the pistons to confine the combustion to the volume of the combustion chamber. In one embodiment, a single exhaust port may exist on one side of the external combustion chamber (disposed substantially at the centerline of the cylinder), whereas exhaust ports may be absent on the opposite side of the cylinder. In other embodiments, one or more exhaust ports may exist on either side of the external combustion chamber. By way of example, the exhaust ports may be opened and closed by sleeve valves that are timed according to the position of the pistons.

An external compression apparatus may produce a compressed air (or other working fluid such as argon or xenon) charge independently from the piston stroke sequence, and inject the compressed air charge directly into the external combustion chamber. The ratio of the final and initial pressures of the working fluid and fuel mixture may be equivalent to a compression ratio, and can be arbitrarily determined by adjustment of the pre-combustion pressure. The working fluid may comprise air, or a mixture of argon, xenon or other inert gas with air or oxygen. Using external compression, a range of desired compression ratios may be chosen without relying on a compression stroke of one or both opposed pistons to perform the compression work, as is done in conventional engines. As some of the pressure-volume work derived from combustion energy is utilized by a conventional engine cycle, typically embodied in conventional Otto or Diesel cycles, to compress the air and fuel charge injected into an engine cylinder, the overall thermal efficiency of the engine is diminished somewhat, but this reduction is taken into account as part of the overall engine losses. A turbocharger or other external compression machine may therefore performed compression of the working fluid, wherein power for the machine may be derived, for example, from a bottom cycling energy extraction scheme. Bottom cycling is an efficient means of extracting residual combustion energy from exhaust gases to perform pressure-volume work, before this energy is ejected into the atmosphere as waste heat. Preferably, a fuel charge is then injected into the combustion chamber under pressure. The fuel charge quantity may be adjusted in relation to the air charge for a specific stoichiometry or phi ratio, as understood by practitioners skilled in the art.

The preferred embodiment of the innovative engine disclosed herein comprises an opposed piston engine comprising at least one cylinder having two ends, a first piston and a second piston forming an opposed piston pair, the opposed piston pair being disposed within and coaxial with said cylinder, each piston of the opposed piston pair comprising a piston head assembly comprising a piston crown and piston skirt, and a piston rod having a first and a second end, wherein the first end of the piston rod is affixed to the piston head assembly, and the second end of the piston rods extending through the ends of the cylinder.

An external combustion chamber disposed along the outer wall of said cylinder, said external combustion chamber's interior volume being in gaseous communication with the cylinder interior volume through an exit orifice of the combustion chamber that extends through the cylinder wall and is a common orifice between the cylinder volume and the internal volume of the external combustion chamber;

A single crank mechanism coupled to the first piston, the single crank mechanism comprising a crankshaft having a central axis aligned at substantially right angles with respect to the cylinder axis and being substantially co-planar with said cylinder axis, at least one member coaxial with the central axis, an elongated crank arm member having a first end and a second end, the first end rotatably affixed to the coaxial member and extending a distance from the central axis, said distance being the radius of rotation, a crank pin affixed to the second end of the crank arm member and offset from the central axis by substantially the crank radius, and an elongated connection arm linkage having a first end and a second end, the first end being affixed to the crank pin, the second end of the connection arm member affixed and coupled to the first piston rod, said connection arm member being at least as long as the crank arm member;

A dual crank mechanism coupled to the second piston, the dual crank mechanism comprising two single crankshaft members as described, each crankshaft member having a central axis aligned at substantially right angles with respect to the cylinder axis and being offset from said cylinder axis, the central axes of each crankshaft member being coplanar, whereby the connecting arm members of each crankshaft member are of equal length and are affixed to the second piston rod.

An external compression means that introduces pre-compressed working fluid into the external combustion chamber, setting a compression ratio without work directly derived from the piston kinetic energy. The external compression means eliminates the need for a compression stroke in the engine cycle, which increases the power output (density) of the engine because more power strokes per engine revolution are realized. Mechanical frictional losses are also reduced due to fewer strokes per cycle.

BRIEF DESCRIPTION OF THE DRAWINGS

FIG. 3b. Inventive engine diagrams showing relative positions assumed by the opposed pistons in relation to crank angles of single and dual crank mechanisms, visualizing the asymmetrical nature of the relative non-sinusoidal piston motion.

FIG. 3c. Inventive engine diagrams showing relative positions assumed by the opposed pistons in relation to crank angles of single and dual crank mechanisms, visualizing the asymmetrical nature of the relative non-sinusoidal piston motion.

FIG. 3d. Inventive engine diagrams showing relative positions assumed by the opposed pistons in relation to crank angles of single and dual crank mechanisms, visualizing the asymmetrical nature of the relative non-sinusoidal piston motion.

FIG. 3e. Inventive engine diagrams showing relative positions assumed by the opposed pistons in relation to crank angles of single and dual crank mechanisms, visualizing the asymmetrical nature of the relative non-sinusoidal piston motion.

FIG. 3f. Inventive engine diagrams showing relative positions assumed by the opposed pistons in relation to crank angles of single and dual crank mechanisms, visualizing the asymmetrical nature of the relative non-sinusoidal piston motion.

FIG. 3g. Inventive engine diagrams showing relative positions assumed by the opposed pistons in relation to crank angles of single and dual crank mechanisms, visualizing the asymmetrical nature of the relative non-sinusoidal piston motion.

FIG. 3h. Inventive engine diagrams showing relative positions assumed by the opposed pistons in relation to crank angles of single and dual crank mechanisms, visualizing the asymmetrical nature of the relative non-sinusoidal piston motion.

FIG. 3i. Inventive engine diagrams showing relative positions assumed by the opposed pistons in relation to crank angles of single and dual crank mechanisms, visualizing the asymmetrical nature of the relative non-sinusoidal piston motion.

FIG. 3j. Inventive engine diagrams showing relative positions assumed by the opposed pistons in relation to crank angles of single and dual crank mechanisms, visualizing the asymmetrical nature of the relative non-sinusoidal piston motion.

DETAILED DESCRIPTION

Figure 1A:
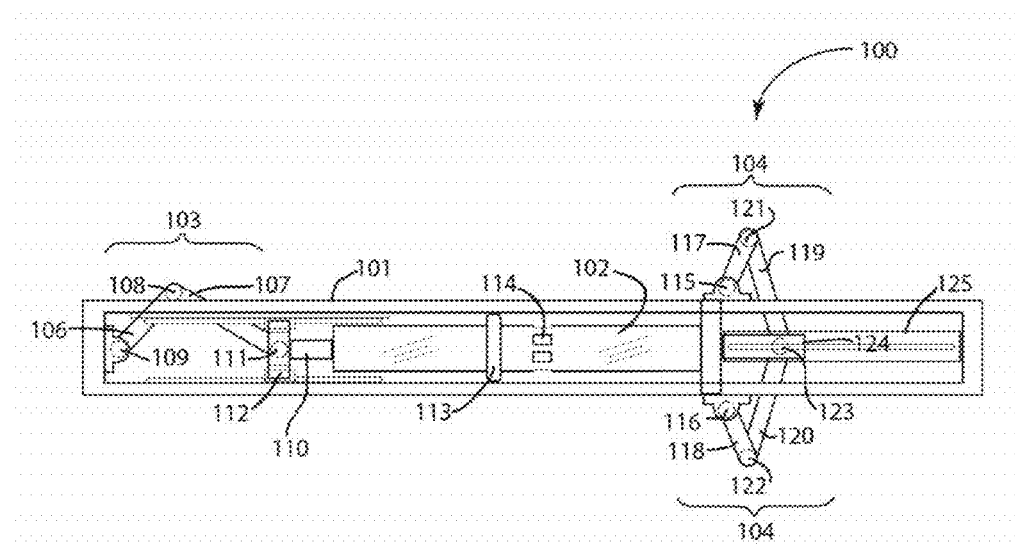
FIG. 1a. Diagram of core of the first embodiment of the inventive engine, showing external view of a single cylinder of the inventive engine.

FIG. 1a schematically depicts a first single cylinder embodiment of the innovative opposed piston engine of the present disclosure. In the depiction, the engine 100 comprises structural frame 101 that supports single engine cylinder 102 serving as a common cylinder housing the opposed piston assembly is retained. For the purposes of clarity in describing the relative positions of the various engine components, inventive engine 100 may be divided into a left half and a right half. The single crank mechanism 103 of the compound crank system is shown disposed at or near the left end of cylinder 102, whereas dual crank mechanism 104 is shown disposed at or near the right end of cylinder 102. It will be understood that the reverse configuration may serve equally well for engine function. Single crank mechanism comprises crank arm 106 that is pivotally connected to linkage 107 via crank pin 108. Crank arm 106 is also affixed to engine frame 101 via articulation 109, about which it may pivot 360. Articulation 109 may be in turn connected to an axis or drive mechanism to transfer rotary power. Linkage 107 is in turn connected to the left hand piston (shown in FIG. 1b) via piston rod 110 and articulation 111, which may be mounted on linear slide mechanism 112, or equivalent.

Positioned near the center of cylinder 102 is external combustion chamber 113, which is shown in a particular toroidal embodiment. In this embodiment, the toroidal shape of combustion chamber 113 encircles cylinder 102, and is affixed in such a way that the interior of the combustion chamber is in communication with the interior of cylinder 102 via one or more orifices. Combustion chamber is otherwise sealed to the exterior. The walls of combustion chamber 113 may be adapted to provide a substantial barrier to heat transfer to the external environment in some embodiments, and may further be adapted in other embodiments to provide near adiabatic barrier to heat transfer to the external environment. Examples of the latter embodiments are described in detail in U.S. Provisional Application Nos. 61/934,841, 61/934,842 and 61/934,844, to which benefit has been claimed in this application, and herein incorporated by reference in their entirety. Combustion chamber 113 may be disposed at the centerline of cylinder 102, or offset from the centerline.

A single exhaust port 114 may be disposed on the right side of cylinder 102, preferably disposed near external combustion chamber 113. Exhaust port 114 is shown as a plurality of co-circumferential slots machined or formed in the wall of cylinder 102, but it is understood that other configurations, such as round ports, are equivalently functional. A sleeve valve (not shown) may be employed to control the opening and closing of port 114.

Still referring to FIG. 1a, dual crank mechanism 104 is depicted as being disposed on the right end of cylinder 102. Mechanism 104 comprises two singe crank sub-mechanisms that may be identical, where crankshafts 115 and 116 are displaced some distance from the axis of cylinder 102. Each sub-mechanism of dual crank 104 comprises crank arms 117 and 118, and are both affixed at a first end to twin crankshafts 115 and 116, respectively, and at a second end are pivotally affixed to linkages 119 and 120, respectively. The latter connection is mediated by articulations 121 and 122, respectively. Linkages 119 and 120 may be in turn pivotally affixed via articulation 123 to right-hand piston rod 124. Articulation 123 allows linkages 119 and 120 to undergo a scissoring motion when the right piston is thrusted towards the right on its trajectory to its ODC, pulling crank arms 117 and 118 towards the cylinder axis, allowing clockwise and counter-clockwise rotation of crankshafts 115 and 116, respectively. The momentum of twin crankshafts 115 and 116 and crank arms 117 and 118 causes linkages 119 and 120 to be pulled apart. An opening scissoring movement by linkages 119 and 120 is therefore engendered, and the right-hand piston is pushed toward the left (toward IDC). As a result, crankshafts are rotated 360 degrees for each reciprocation cycle of the right-hand piston, rotating crank arms 117 and 118 through 360 degrees, whereas linkages 119 and 120 may pivot through substantially 90 degree arcs. Piston connecting rod 124 may be supported by rail 125 to support and facilitate the linear reciprocating motion piston rod 124.

Figure 1B:
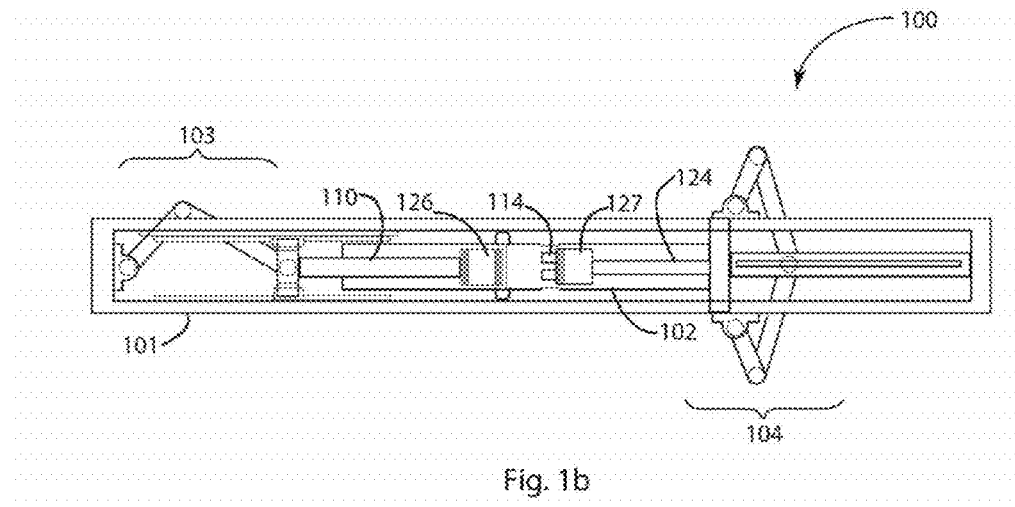
FIG. 1b. Diagram of core of the first embodiment of the inventive engine, showing exposed view of internal portion of the single cylinder, revealing the opposed pistons FIG. 2a. Diagram of core of the second embodiment of the inventive engine, showing external view of a single cylinder of the inventive engine.

In FIG. 1b, the opposed pistons 126 and 127 are exposed in a sectional view of cylinder 102. The two opposed pistons 126 and 127 are coaxial with the cylinder 102, and comprise a piston head assembly affixed to pistons rods 110 and 125 that extend from the ends of the cylinder.

Figure 2A:
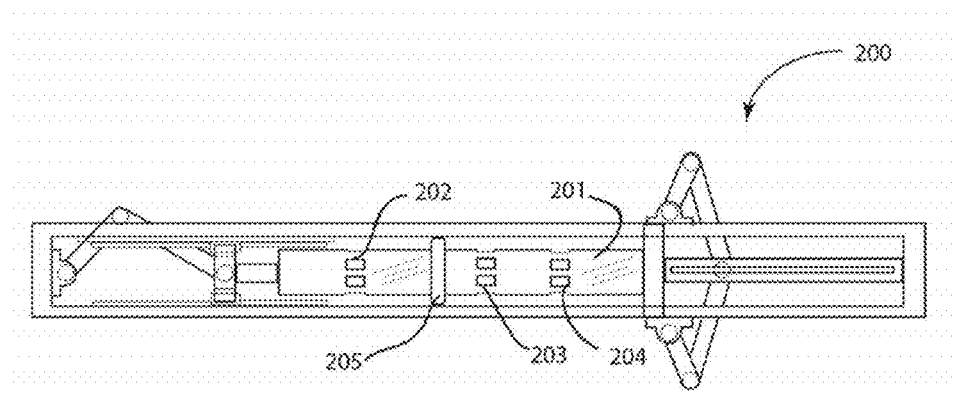
FIG. 2b. Diagram of core of the second embodiment inventive engine, showing exposed view of internal portion of the single cylinder, revealing the opposed pistons FIG. 3a. Inventive engine diagrams showing relative positions assumed by the opposed pistons in relation to crank angles of single and dual crank mechanisms, visualizing the asymmetrical nature of the relative non-sinusoidal piston motion.
Figure 2B:
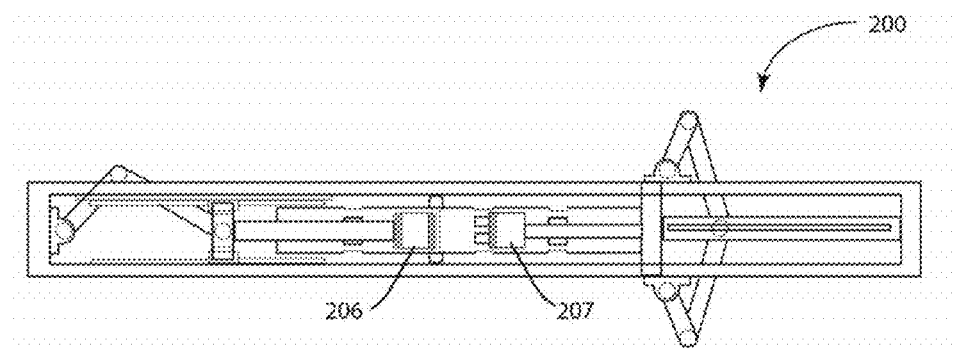

A second embodiment of the inventive engine comprises more than one exhaust port. Referring to FIG. 2a, engine 200 is constructed similarly to the engine embodiment of FIGS. 1a and 1b, and is mostly identical. Therefore, the reader is referred to the above discussion for structural details not included in the following description. Cylinder 201 comprises two additional exhaust ports 202 and 204 in addition to port 203, depicted in FIG. 1a and described above. Exhaust ports 202-204 are shown as pluralities of co-circumferential elongated orifices in the example of FIG. 1b, but other configurations may be equivalently functional. Port 202 may be disposed on the left half of cylinder 201, whereas ports 203 and 204 may be disposed on the right half of cylinder 201, Ports 203 and 204 may be positioned such that one port 204 is near the ODC of the right-hand piston, and one port 203 is disposed near external combustion chamber 205. FIG. 2b depicts an exposed view of opposed pistons 206 and 207. Again, structural details previously described are omitted here.

In FIG. 3(a-n), the opposed piston motion engendered by the innovative compound crank system is depicted in a sequence of separate frames comprising a complete engine cycle, with a schematic representation of the inventive engine. The revolutions of the single crankshaft and those of the dual, or twin crankshafts on either end of the engine are synchronized with each other, but the angular positions of the single crankshaft may not coincide with the angular positions of the dual, or twin crankshafts in order to engender desired piston motion. Vertical broken lines are shown to illustrate the IDC and ODC positions of both the left and right-hand pistons. These lines delineate the limits of motion of the respective pistons. It can be seen that the IDC of the left-hand piston extends well to the right of the external combustion chamber, while the IDC of the right-hand piston remains on the right side of the combustion chamber. The motion of each piston is governed by separate equations of motion derived for the both the single crankshaft and the dual crankshaft, and these equations of motion are discussed in more detail below. In FIG. 3a, the left-hand piston is shown at its IDC position. Both the linkage and crank arm members of the single crankshaft on the left hand side of the engine are fully extended and collinear with the cylinder axis. In the vicinity of the IDC, the left-hand piston head assembly wholly or partly occupies the region between the IDC positions of the left- and right-hand pistons, and thus a portion of the piston skirt covers the exit orifice of the external combustion chamber as it advances toward, dwells at, and recedes from IDC.

During the portion of the engine cycle where the exit orifice of the external combustion chamber is blocked or covered by the left-hand piston, compressed working fluid may be injected into the external combustion chamber, followed by an injection under pressure of the fuel charge. Alternatively, a compressed pre-mixed fuel/oxidizer charge may be introduced into the combustion chamber. Ignition may be timed to occur either by a spark or by compression ignition immediately following fuel injection. Preferably, the combustion is substantially complete before the left-hand piston recedes past the exit orifice position. As the left-hand piston recedes and exposes the orifice, exhaust gases near peak pressure and temperature begin to escape from the external combustion chamber into the cylinder volume.

While the right hand piston is not involved in covering the exit orifice, the role of the right hand piston is important for the following reasons: a) to provide enhanced exhaust gas scavenging, and b) to maintain a small cylinder volume when the combustion gases do enter the cylinder. Thus, the dual crankshaft produces a piston motion profile such that the right-hand piston may rapidly accelerate from its ODC at the bottom of its cycle towards its IDC in order to catch up with a receding left hand piston. This strategy is taken in order to rapidly close the gap between the two pistons by causing the right hand piston crown to come into closest proximity with the left-hand piston crown, and maintain this proximity while the left-hand piston starts to recede from its IDC, but before it recedes too far and uncovers the combustion chamber orifice. This motion is illustrated in FIGS. 3b and 3c. Both pistons are moving to the left, and move in unison in order for the two pistons to remain in closest proximity for a small portion of the time they occupy the space between the two IDCs. During this time, combustion may be initiated within the external combustion chamber. In FIG. 3d, the left-hand piston has already receded past the external combustion chamber orifice, allowing exhaust gases to begin to escape into the small inter-piston space in the cylinder. Preferably, both pistons crowns are in closest proximity with the right-hand piston is at its IDC. In FIG. 3e the pistons are shown to begin moving apart as a direct result of expanding exhaust gases, The right-hand piston may be momentarily motionless in as it may dwell at its IDC, whereas the left-hand piston already in motion at the time the gases are released into the cylinder, causing the left hand piston to undergo rapid acceleration toward its ODC, starting a rapid expansion stroke. At this stage in the engine cycle, the combustion gases are entering the growing cylinder volume and acting on the pistons.

Having the opposed pistons remain in closest proximity during this critical portion of the engine cycle assures that the cylinder volume remains at a minimum value when exhaust gases are released into the cylinder volume between the two pistons. An example of closest proximity may be a separation distance of approximately 1 cm, or approximately 0.5 inch. This is an important advantage provided by the disclosed engine, as expansion of the combustion gases into a small but growing cylinder volume ensures that they will not lose critical pressure and temperature to sudden depressurization, and remain substantially at or near peak combustion pressure for the initial portion of the expansion stroke. Therefore, maximum pressure force may be imparted to the pistons in the beginning of the expansion stroke where much more of the combustion energy can be utilized for extracting pressure-volume work than can be obtained in conventional engines, including many opposed piston configurations. As the gases expand near-adiabatically in the cylinder during the expansion stroke of the piston, they cool and depressurize exponentially along the length of the expanding cylinder volume, but have already imparted most of their heat energy (in its manifestation as pressure) to the pistons as kinetic energy when the cylinder volume was near its smallest value where the cylinder pressure scales exponentially higher than obtained even after very small increases in cylinder volume.

Another advantage provided by the disclosed engine is the hyper-rapid piston expansion made possible by the asymmetric non-sinusoidal motion profile of the disclosed crank arrangement. Providing a hyper-rapid expansion stroke, combined with a large expansion ratio, is very important to increase the thermal efficiency of an engine, as exhaust gases may cool adiabatically on a time scale to prevent significant heat loss through the cylinder wall and piston surfaces. In other words, exhaust gases may cool adiabatically or quasi-adiabatically faster than heat can escape through the piston and cylinder surfaces, if the piston expands at speeds sufficient to reduce the temperature of the expanding combustion gases before significant amounts of heat energy are lost by heat transfer through the cylinder surfaces. Sinusoidal motion is generally too slow to prevent such heat transfer, unless the expansion stroke length is very long or the expansion ratio is sufficiently large, which may not always be practical.

Figure 5:
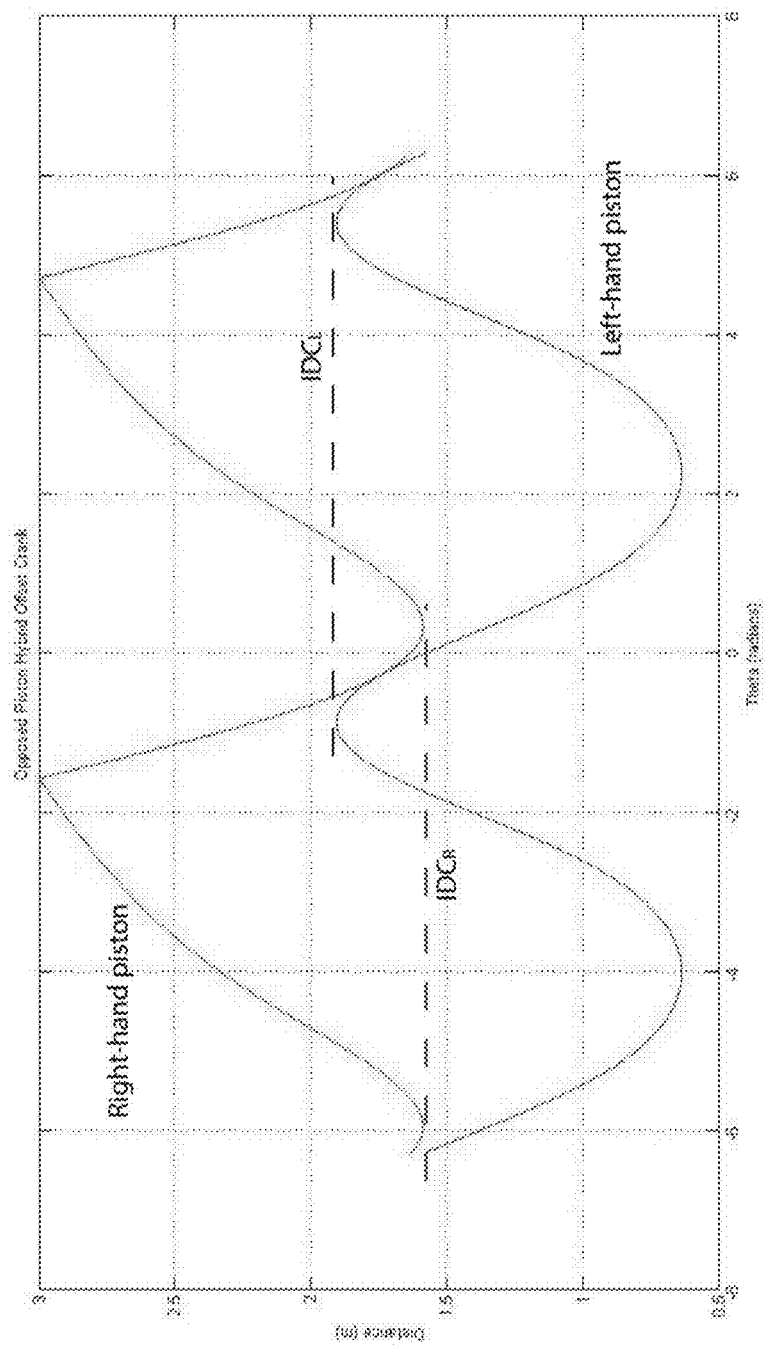
FIG. 5. Plot of the right- and left-hand piston profiles as functions of crank angles for second embodiment having two dual crank mechanisms. Asymmetry is controllable for both opposed pistons, allowing better optimization of combustion timing. Graphical representation by plot of the right- and left-hand piston profiles as a function of crank angles theta for the left-hand and right-hand pistons, in accordance with the piston positions shown in FIG. 3a-n.
Figure 6:
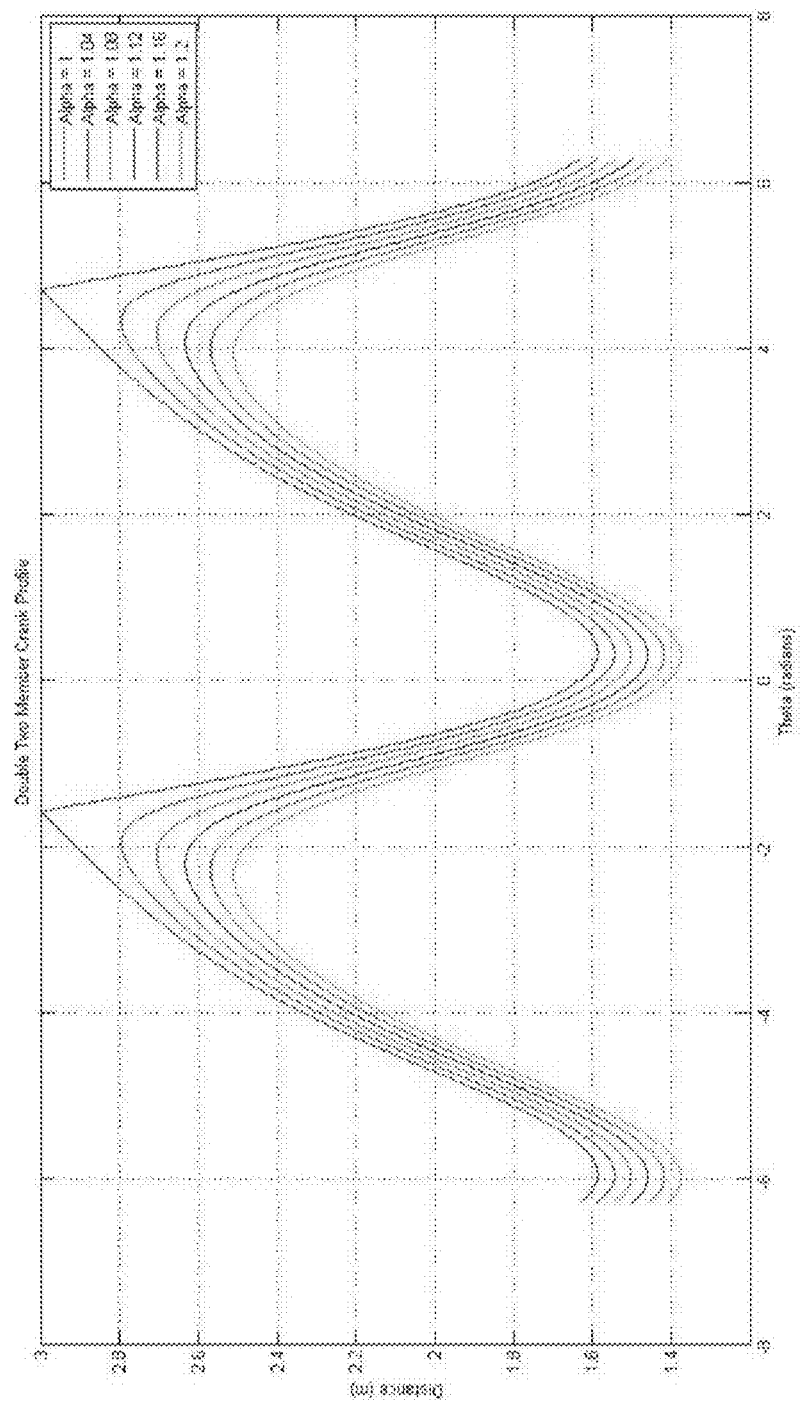
FIG. 6. shows a family of right-hand profiles calculated for a range of values of α, where $1.0 \geq \alpha \geq 1.2$.
Figure 7:
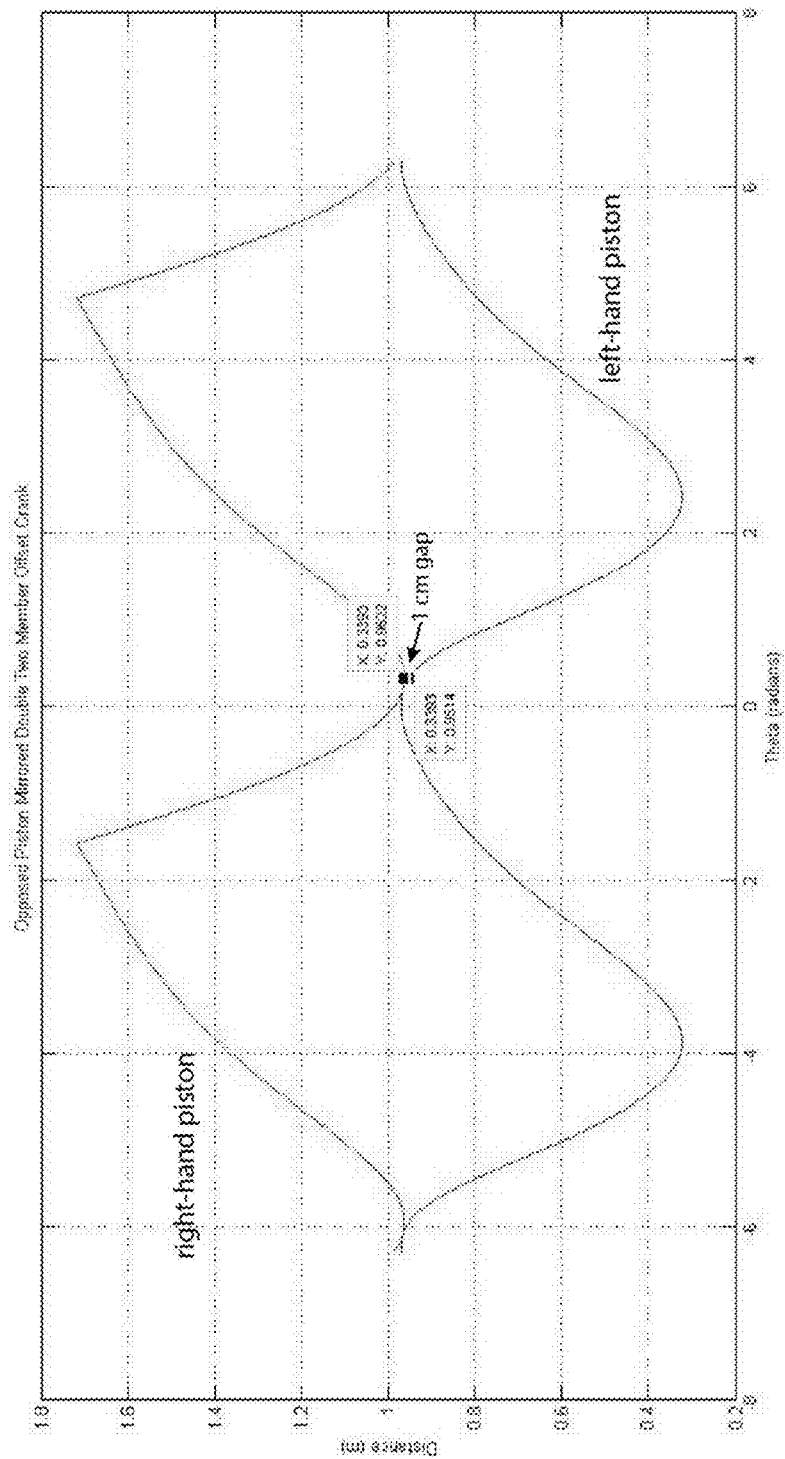
FIG. 7. shows an example of piston profiles resulting from dual crankshafts on both right and left sides of the engine cylinder.

The term hyper-rapid piston expansion is used here to mean that the expansion stroke period of the hyper-rapid piston is measurably shorter than that of the same piston undergoing sinusoidal motion (as occurs in Otto and Diesel cycle engines) for the same stroke length and engine rpm. Another way to define this is to state that for a given expansion stroke length, a hyper-rapid expansion stroke requires less crank angle for the piston to complete the stroke compared to the same piston undergoing sinusoidal motion. In this class of conventionally cranked piston engines, piston motion profiles are substantially sinusoidal, meaning that the expansion and compression strokes always require the same amount of crank angle to complete. Moreover, the compression and expansion strokes are symmetrical. Attempts have been made to change the stroke lengths relative to one another, to obtain, for instance, a larger expansion ratio than compression ratio, in order to produce Atkinson cycle-like engine operation and behavior to improve thermal efficiency. The slopes of sinusoidal motion profiles only change with the engine speed, or rpm, as higher engine rpm compresses the cycle and increases the slopes corresponding to compression and expansion phases. This is shown in FIGS. 5-7, and discussed below. However, the amount of crank angle required to complete the compression and expansion strokes is constant in a pure sinusoid regardless of engine rpm. Non-sinusoidal profiles, on the other hand, provide more freedom to manipulate the relation between the crank angle and slope of the profile.

Concerning augmented crank mechanisms, there are particular concerns regarding the complexity and robustness of these systems. The present disclosure teaches an engine wherein crankshafts and well known crankshaft technology, which are well known and understood in the engine arts with their long history of use and knowledge of design and manufacture. The present disclosure teaches how simple crankshaft mechanisms may be combined in such a way to realize more complex crank mechanisms capable of producing the desired piston motion profiles described herein. Ultimately, high engine efficiency goals are achieved without the use of additional components and mechanisms that are untested for long term use, and may prove to be inherently non-robust.

In FIG. 3f, the right-hand piston is now undergoing its power stroke, while the left-hand piston is reaching its IDC. In FIG. 3g, the left-hand piston has reached its ODC position and dwells there, while the right-hand piston is in motion, shown here to be in approximately the middle of its expansion stroke towards its ODC. At this time, the left-hand exhaust port may open by operation of a sleeve valve, as an example, allowing a portion of the exhaust gas volume to be purged from the cylinder. At this point, the cylinder volume is at its maximum and begins to shrink. Because of the hyper-rapid nature of the expansion stroke, the left-hand expansion stroke may provide the principle source of power for the engine and drive train. In the example shown here, the expansion of the right-hand piston may be relatively slow in comparison to the left-hand stroke. The right-hand piston may also provide power to the drive train. Although the right-hand expansion is slower than the left-hand expansion in this example, the rpm of the dual crankshaft (coupled to the right-hand piston) is equal to the rpm of the single crankshaft (coupled to the left-hand piston). The slower expansion of the right-hand piston may cause this piston to lose power relative to the left-hand piston, but the right-hand piston contributes to the overall engine power nevertheless. The exhaust ports are shown uncovered on the inside by the piston, but a sleeve valve on the exterior of the cylinder wall, not shown, may close the exhaust ports during the expansion phase so that combustion gases may not be exhausted to the atmosphere prematurely.

In FIG. 3h, the left-hand piston begins its trajectory toward its IDC. At this time, the left-hand exhaust port may open by operation of a sleeve valve, as an example, allowing a portion of the exhaust gas volume to be purged from the cylinder. At this point, the cylinder volume is at its maximum and begins to shrink. In FIG. 3i, the right-hand piston has reached its ODC, and now begins to move rapidly towards its IDC, while the left-hand piston has moved past the left-hand exhaust port. At the same time, the two right-hand exhaust ports may open, allowing the remaining portion of the exhaust gases to be purged. In FIG. 3i, the left hand piston now blocks the combustion chamber orifice, while at the same time purging the shrinking cylinder volume through the two right-hand exhaust ports, with the coordinated motion of the right-hand piston closing the gap, FIGS. 3(k-n) show the completion of the cycle, where steps a-d of FIG. 3(a-d) are repeated. The travel of the pistons to their IDC positions with the exhaust port open purges the exhaust gases at substantially atmospheric pressure surrounding the cylinder environment. In this way, the pressure remains substantially constant, and no pressure-volume work may be expended in carrying out the purging, or exhaust stroke in the disclosed engine, increasing the overall thermal efficiency of the engine.

According to the present disclosure, fuel ignition is timed to occur in advance of the arrival of both pistons at IDC. The timing advance may be chosen to ensure that the combustion chamber orifice is temporarily blocked by at least one of the pistons at or near IDC during combustion to allow substantially complete combustion to occur within the confines of the combustion chamber volume before the burned combustion gases expand into the engine cylinder. The asymmetric piston motion as taught by the present invention allows the piston pair to have an offset trajectory that causes the first piston to arrive at the first IDC position in advance of the second piston's arrival at the second IDC. The first IDC being an apex of the first piston's motion trajectory, the first piston reverses direction after reaching the first IDC and begins to accelerate toward its (first) ODC position at the extreme left end. As the first piston begins to recede, the second piston is still advancing and approaches the second IDC position from the right, and decelerates while approaching the second IDC. At a point before the reaching the second IDC, the velocity of the first piston (receding toward the left, accelerating) is matched to that of the second piston (advancing toward the left, decelerating). The piston heads remain at closest proximity with respect to each other while the piston velocities are substantially equal, and travel together to the left until the second piston slows to zero velocity upon reaching the second IDC position, whereupon a the second piston (right side) enters into a dwell phase and remains stationary. At this point, the exit orifice of the external combustion chamber is exposed by left-receding first piston and high pressure exhaust gases expand into the small but growing cylinder volume. Thus the invention provides the following advantages Initial exhaust gas expansion into a small cylinder volume when gas pressure is highest. The opposed piston heads are at or near their closest proximity at the time the orifice is exposed to the cylinder and exhaust gases are released at their highest pressure into a minimal cylinder volume, preserving the high-pressure state of the gases. The first piston (right) reaches the first IDC before the second piston reaches the second IDC. The first piston has a zero dwell or very short dwell at the first IDC, and rapidly reverses its trajectory after reaching the first IDC, receding to the left. Second piston is synchronized to meet the first piston shortly after the first piston begins to recede, and travel together toward the left for approximately the length of the first piston. The exit orifice of the combustion chamber is covered by the first piston for a period determined by the first piston velocity and dwell period at first IDC, if any. Preferably during this period, a compressed fuel charge is injected in the external combustion chamber and ignited to combust rapidly enough to be complete by the time the first piston recedes past the exit orifice of the combustion chamber.

Advantageously, completely burned exhaust gases expand into a small but growing cylinder volume. In a conventional engine, especially one having a high compression ratio, the surface to (combustion) volume is very high, favoring convective and conductive heat transfer by contact of hot exhaust gases with piston crown and exposed cylinder head and wall surfaces. The heat loss from hot exhaust gases by convective/conductive surface transfer with a high surface to volume ratio of the combustion volume is one of the most significant reasons for low thermal efficiencies in conventional IC engines. Conventionally, the piston dwells at or near TDC during the combustion phase, where its velocity is zero or very low. Therefore, there is also an inertial component for the gas pressure to overcome in converting combustion energy to pressure-volume work, in accelerating the piston to BDC from zero or low velocity at TDC to maximum velocity (although crank momentum helps here too). Furthermore, losses due to unburned gases trapped in interior crevices can be significant in conventional high compression engines, since the combustion volume is very small, and surface to volume ratio is significant. Crevice losses may account for as much as 5-10% reduction in thermal efficiency. In the present invention, the gases are combusted in a constant volume, optimized surface to volume ratio, combustion chamber with extremely low or zero heat transfer.

Although the exhaust gases may be expanded into a small cylinder volume, virtually no crevice losses exist since gases have been combusted virtually completely, eliminating crevice losses. In addition, the first piston is receding rapidly, therefore its velocity is substantial. The expanding exhaust gases do not need to overcome inertia of the first piston since it is already set in motion, and can therefore transfer momentum to increase the rate of acceleration of this piston, not losing it to overcome reactive forces. This advantageously allows very rapid expansion of the left side of the cylinder, which maximizes the conversion of combustion heat energy to pressure-volume work in accelerating the first piston toward the first ODC on the extreme left end of the cylinder, and minimizes any heat transfer losses through the cylinder wall.

Figures 3K, 3L, 3M, 3N:
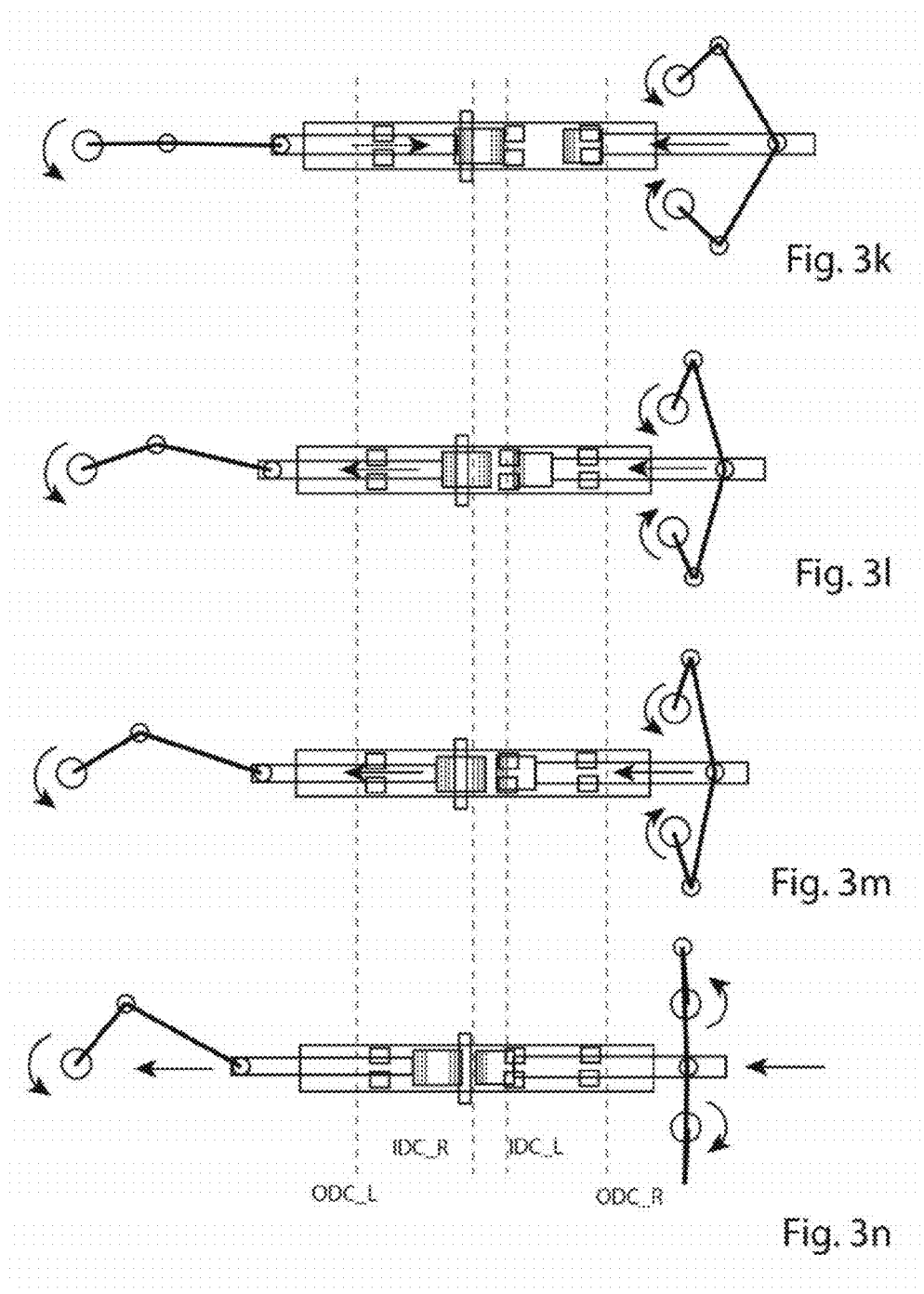
FIG. 3k. Inventive engine diagrams showing relative positions assumed by the opposed pistons in relation to crank angles of single and dual crank mechanisms, visualizing the asymmetrical nature of the relative non-sinusoidal piston motion.
FIG. 3l. Inventive engine diagrams showing relative positions assumed by the opposed pistons in relation to crank angles of single and dual crank mechanisms, visualizing the asymmetrical nature of the relative non-sinusoidal piston motion.
FIG. 3m. Inventive engine diagrams showing relative positions assumed by the opposed pistons in relation to crank angles of single and dual crank mechanisms, visualizing the asymmetrical nature of the relative non-sinusoidal piston motion.
FIG. 3n. Inventive engine diagrams showing relative positions assumed by the opposed pistons in relation to crank angles of single and dual crank mechanisms, visualizing the asymmetrical nature of the relative non-sinusoidal piston motion.

FIG. 3m depicts the case where the right-hand piston catches up with the left-hand piston, closing the cylinder volume completely. In this frame, both pistons are in still motion, but the right-hand piston is slowing as it approaches its IDC, and the left-hand piston is beginning its recession from its IDC position. The two pistons continue in synchronous motion towards the left side, and from this point, share their trajectories for at least a portion of the volume between the two IDC positions. It is also seen that the right-hand piston has surpassed the exhaust port, where at this point the exhaust gases have been essentially completely purged from the cylinder. Between the frames shown in FIGS. 3k and 3n, the exit orifice of the combustion chamber is covered by the left-hand piston, isolating the external combustion chamber. During this portion of the engine cycle, compressed air or other oxidizer is injected into the isolated combustion chamber, and may be followed by high-pressure injection of the fuel charge. Alternatively, both oxidizer and fuel may be injected into the isolated combustion chamber under pressure as a pre-mixed fuel/oxidizer (air) charge. Ignition may be timed to occur either by electrical arc (spark) or by compression ignition.

As mentioned earlier, the external combustion chamber may be constructed so that it presents a nearly adiabatic heat barrier to the hot combustion gases in the interior, so heat losses are virtually nil while gases remain in the combustion chamber. In this way, a much greater portion of the combustion energy may be directly converted to piston pressure-volume work. Timing losses, which occur as combustion gases continue combustion late in the expansion stroke, are also reduced to virtually zero as combustion of the fuel mixture may be completed within the confines of the external combustion chamber before the combustion gases enter the cylinder, in accordance with this disclosure. The piston trajectories begin to diverge when the left-hand piston begins to accelerate as it enters into the expansion stroke, while simultaneously, the right-hand piston begins to slow as it approaches its IDC and enters into its dwell period there. and may already be in motion when exhaust gases start to perform pressure-volume work on that piston.

In FIG. 3n, the right-hand piston is shown in its dwell (stopped) at its IDC, which is at the midway point in the cylinder. The external combustion chamber may be mounted on the exterior of the cylinder wall, with its exit orifice straddling the midway point or just to its left. The left-hand piston is shown at the top of its expansion stroke. A gap between the two pistons has now widened to expose the exit orifice of the external combustion chamber, allowing the combustion gases to begin entering the cylinder near peak pressure. It is emphasized here that the gap is not static, but expanding. However, the combustion gases are released into the gap, which is the small but expanding cylinder volume as referred to earlier, where little to no depressurization takes place as would happen if the gap were significantly wider. An optimal gap distance may be 1 cm, or 0.5 inch. The minimization of depressurization may ensure that the combustion gas pressure remains substantially at or near peak pressures attained inside the combustion chamber, and this maximal pressure may act on both pistons at or near the top of their expansion phases, where the greatest amount of pressure-volume work can be expended on the power strokes.

The left-hand piston is already in motion when the expanding combustion gases enter the cylinder volume. Since this piston is already in motion, almost none of the pressure-volume work performed on the piston by the combustion gases needs to be lost to overcoming piston inertia, which robs some of the thermal efficiency. This would be the case if the combustion gases expanded into the cylinder volume with this piston still dwelling at IDC, which is generally true in many types of engines. On the other hand, the right-hand piston is in its dwell state, and energy must be expended to overcome its inertia. The expansion profile for the right-hand piston is slower than that of the left-hand piston, and therefore not as efficient. Regardless, the piston profiles are synchronized, thus the cycle periods are the same, resulting in equal rpm of the crankshafts. More the power may be extracted by the drive train from the left-hand piston in this example, and less power may be generated by the right-hand piston due to the slower expansion profile of this piston. The slower expansion profile results from the nature of the dual crankshaft motion, which will now be explained.

The crankshaft motion may be understood when viewed from a plane perpendicular to the axes of rotation, which are parallel. As mentioned earlier, the crankshaft members comprise a primary rotational axis and a secondary rotational axis. The primary rotational axis may also be referred to as the central axis of the crankshaft, ultimately coupled to the drive train. The elongated crank arm members are rotationally affixed at a first end to structural members along the central axis of the crankshaft. A first end of the elongated connecting members is pivotably affixed to the second end of the crank arm, forming the secondary rotational axis of the crankshaft. The second end of the elongated connecting members is pivotably affixed to the piston rods, which may in turn remain substantially coaxial with the cylinder. The piston rods may have freedom to articulate with the piston head assembly to relieve mechanical strain and stresses, but preferably does not deviate significantly from its coaxial orientation.

According to the present invention, the right-hand piston motion is governed by the double crank mechanism. The double crank mechanism thus comprises two crankshafts, each having an articulating arm affixed at one end to a crankpin, the other end coupled to a point at or near the end of the common piston rod. The articulating arms are coupled to the second piston rod (right side), with red circles representing the throw or offset of the crankpins with respect to the central axes of the respective crankshafts. Each crankshaft member may be aligned with respect to one another with central axes parallel. In FIGS. 1-3, the double crank mechanism is shown end on, wherein a first crankshaft member is disposed above the cylinder axis and a second crankshaft member is disposed below.

The imaginary circles circumscribed by the crank arm throw are in tangential proximity, almost touching at a single point along the piston rod axis. An imaginary symmetry plane orthogonal to the plane of the view bisects the assembly through the point of tangency between the two circles, and contains the cylinder axis as well. The articulating arms are shown pivotally attached at or near the circumferences of the imaginary circles, where the radius of the imaginary circles represent crank pin offset distances from the central axis of the respective crankshafts. A fixed arm segment shown extending from the center of each imaginary circle to the point of attachment of the articulating arms schematically represents the physical crankshaft.

To aid in explaining the motion of the double crank, the imaginary circles representing the crank offsets may be divided into quadrants, with the upper circle mirroring the lower circle. As reference to rotational angles, rotation is taken to start at zero degrees is on the left hand side of the circles, 180 degrees on the right hand side of the horizontal symmetry axes dividing the upper and lower quadrants of both circles. As the upper crankshaft turns counterclockwise, its 90 degree rotation angle position is demarked at the bottom of the vertical symmetry axis of the upper circle, dividing the first and second quadrants. The lower crankshaft rotates clockwise, so its 90 degree rotational demarcation is inverted with respect to the upper circle, where 90 degrees is demarked at the top of the vertical axis bisecting the lower circle, also between first and second quadrants. Again, the lower circle is a mirror image of the upper circle. For a 270 (−90) degree rotation, the demarcation is inverted.

When engaged, the rightward thrust of the second piston causes the upper crankshaft member to rotate counterclockwise, while the lower crankshaft member simultaneously rotates clockwise, as mentioned above. As the right-hand piston recedes toward the right, the connecting arm linkages produce a scissor-like motion whereby they extend to the right while closing an angle theta formed with the piston rod. As shown in FIG. 2d, the articulating arms scissor closed (zero angle with respect to the piston rod) when the crankshafts rotate 90 degrees. The apex of this extension is reached when the second piston reaches its (the second) ODC.

At this point, the articulating connecting arm linkages form an angle with the piston rod such that they are collinear with a line drawn from the center of the main crankshaft axes (center of red circles) to the point of attachment with the piston rod of the second piston. In the diagram of FIG. 3i, they are shown to form approximately a 0 degree angle at maximum ODC extension of the rod of the right-hand piston, fully extended through the fourth quadrants of the circles. After this point, the continued rotation of the crankshaft members forces the articulating arms to begin to scissor closed, thus driving the right-hand piston forward towards its IDC position as a result of the decreasing angle between the crank arm and connecting arm linkage. In addition to the stroke length of the right-hand piston being determined by the combined length of the articulating arms and the crank offset distance, so too is the linear acceleration of the right-hand piston relative to the rotational speed of the crankshafts. It can be shown that the position and speed of the right-hand piston can be expressed by the equations of motion, Eq. 1, described below.

Figure 4:
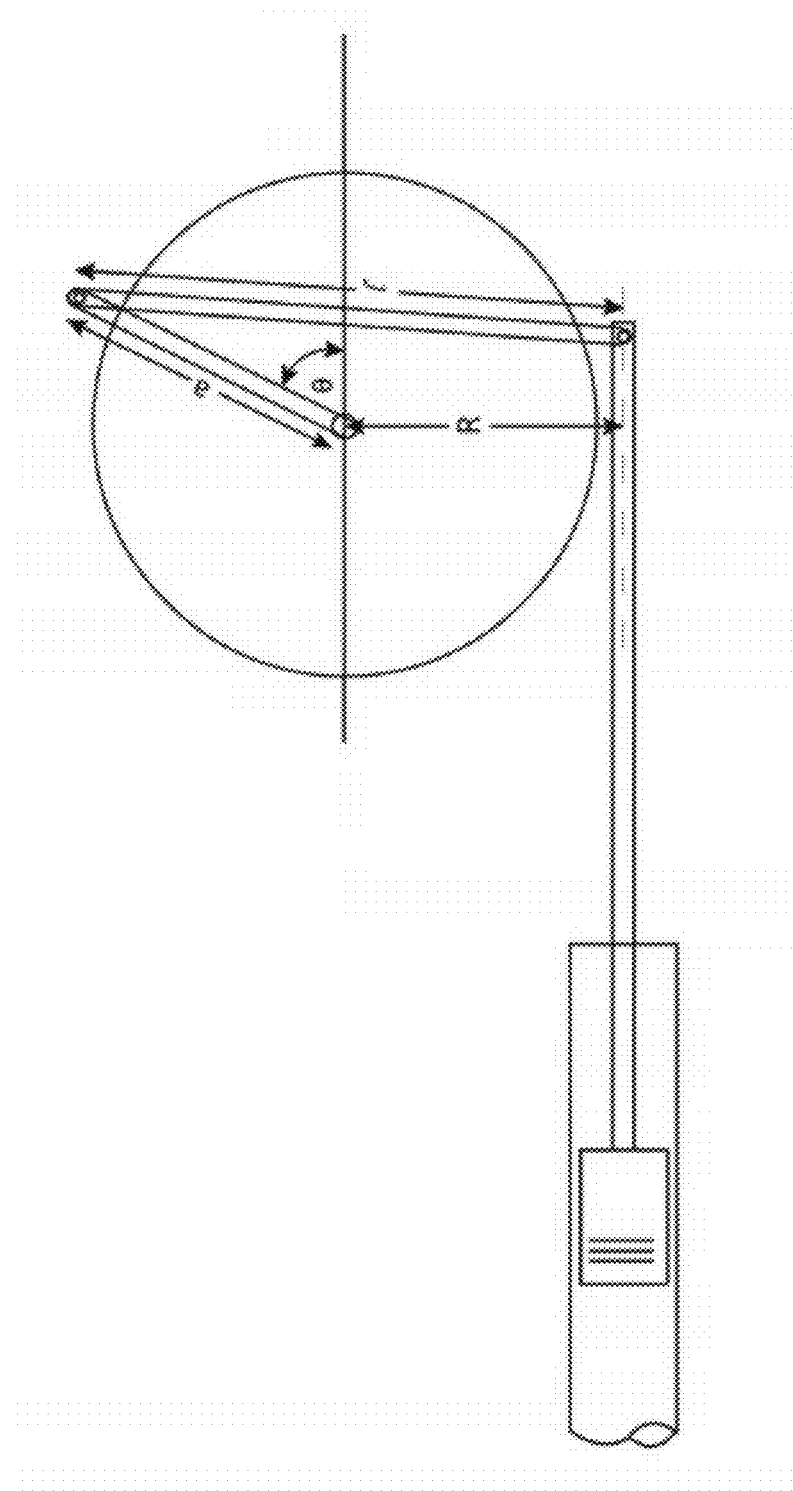
FIG. 4. First principles diagram showing the parameters used to analyze the piston motion in the equations of motions derived from this diagram.

Referring to FIG. 4, a diagram is presented showing the angular relationships between the three rotational axes of the dual crankshaft, comprising the crank arm and connecting arm members, and the piston rod. An angle theta ($\theta$) is defined as being subtended by the crank arm and an imaginary horizontal line passing through the primary rotational axis. The angle $\theta$ is also the crank angle. The dual crank is offset from the cylinder axis by a distance R. The diagram in FIG. 4 demonstrates a mathematical construct of the dual crankshaft. According to FIG. 4, the displacement of the piston face $P_R(\theta_R)$ along the cylinder axis when coupled to the dual crankshaft as a function of crank angle $\theta_R$ of that crankshaft (on the right-hand side of the engine cylinder, according to the convention of the embodiment exemplified), can be expressed by a governing equation of motion of the right-hand piston, expressing the non-sinusoidal motion profile of the right-hand piston as expressed by displacement of the piston face as a function of crank angle, taking into account the relationship of arm member lengths $a_R$ of the crank arm and $l_R$ of the connecting arm, and the crank angle $\theta$ presented as Eq. 1:

$$P_R(\theta_R) = a_R \cos\theta_R + \sqrt{l_R^2 - (a_R\sin\theta_R + R)^2} + C + d_R \quad (1)$$

where the subscript R refers to the right-hand piston, coupled to the dual crankshaft, according to the embodiment convention. Constants C and $d_R$ refer to the total piston length, comprising the piston rod and piston head assembly, and the initial displacement of the piston face from the IDC position, respectively.

A similar equation can be derived for the left-hand piston motion profile, expressed as left-hand piston face displacement $P_L(\theta_L)$, taking R=0, since the primary axis of the single crankshaft and the cylinder axis are coplanar, resulting in Eq. 2:

$$P_L(\theta_L) = a_L \cos\theta_L + \sqrt{l_L^2 - (a_L\sin\theta_L)^2} + B + d_L \quad (2)$$

where the subscript L refers to the left-hand piston, coupled to the single crankshaft on the right of the cylinder according to the embodiment convention. The constants B and $d_L$ refer to the total length of the left piston and displacement from the its IDC position, respectively. It may be stated that B=C. Left and right crank angles $\theta_L$ and $\theta_R$ are distinguished as they may be independently set.

An exemplary graphical representation of Eq. 1 and 2 expressing the piston motion profiles as functions of left and right crank angles is shown in FIG. 5. Here, graphical representations of Eqs. 1 and 2 are juxtaposed to represent the positional relationships between the two pistons as depicted in the animation frames of FIG. 3a-n, with the crank angles of the single crank mechanism and dual crank mechanism de-phased by 60 degrees. It can be seen in FIG.

5 that the motion profile of the right-hand piston is markedly asymmetric and non-sinusoidal in appearance when compared to the motion profile of the left-hand piston. The left-hand profile is also non-sinusoidal, however is symmetric and not as obvious as that for the right-hand profile. The non-sinusoidal nature of the left-hand profile is manifest in the steeper slopes of the profile in comparison to a pure sine function. The steepness of the slope of the profile is related to the amount of crank angle associated with the change in displacement, therefore is also proportional to the velocity and acceleration of the piston in these portions of the crank angle domain.

The shape of the profiles is controlled by the relative lengths of the crank arm and connecting arm members. For the dual crankshaft, the profile shape is further modified by the additional distance R, representing the offset from the cylinder axis. This additional distance accentuates the asymmetry and non-sinusoidal shape of the right-hand piston profile, as can be seen in FIG. 4. Accordingly, the maxima of the left-hand profile and the minima of the right-hand profile represent the pistons at their IDCs. The opposite extrema represent the respective ODCs. As the profiles are synchronized in time, the profiles are displaced in crank angle, so that the IDCs are not reached simultaneously, according to the present disclosure. The profiles are also shown to overlap in the region of the IDCs, where a segment of each of the two profiles coincide, corresponding to the shared trajectory of the right-hand and left-hand pistons between the two IDCs, as seen in FIGS. 3b-d or FIGS. 3l-n. As shown in the animation sequence, the length ratio of the connecting arm member to the crank arm member is substantially equal to two for both the single and dual crankshafts. For the dual crankshaft, the primary rotation axes are offset from the cylinder axis substantially by the crank arm member length, or more specifically, the crankshaft members of the dual crankshaft are offset from the cylinder axis by their crank radii, which preferably may be equal.

The geometry of the dual crankshaft holds that the dimensional parameters of Eq. 1 cannot be arbitrary, and it can be shown that a design rule exists and needs to be respected for generally choosing values for these dimension parameters. Thus a ratio of these parameters can be expressed by the quantity α, where $$\alpha = \frac{l_R}{(a_R + R)} \geq 1 \qquad (3)$$

The value of α influences the degree of asymmetry and peakedness of the right-hand piston profile. FIG. 6 shows a family of right-hand profiles calculated for a range of values of α, where $1.0 \geq \alpha \geq 1.2$. It can be seen from FIG. 6 that as α increases, the profile becomes more symmetric and less peaked (kinked). Thus, the piston profiles may be readily controlled and optimized to achieve desired engine performance by simply adjusting the dimensional parameters of the crankshafts.

Finally, an example of piston profiles resulting from dual crankshafts on both right and left sides of the engine cylinder is shown in FIG. 7. Here, the right hand curve is peaked at ODC, and the left-hand profile is more round, but noticeably askew, as the shapes of the individual piston profiles are more freely adjusted by having three dimensional parameters. In this instance, the profiles are engineered to have a small gap of approximately 1 cm when the right piston reaches and dwells at its IDC. The skewedness of the left piston profile is necessary to produce a larger slope value on the expansion side than on the exhaust stroke side, not only for high expansion velocity, but also to allow the left-hand piston to reach its IDC first, then meeting the right-hand piston in such a way that the opposed pistons to come into closest proximity close to the end of their respective travels and share a small portion of their trajectories while the left-hand piston begins to recede while the right-hand piston enters in its IDC dwell. At this point, the approximately 1 cm gap is formed, and the exit orifice of the external combustion chamber may be exposed to allow the combustion gases to enter the cylinder.

While the embodiments presented in this disclosure are representative of the preferred mode of the innovative non-sinusoidal asymmetrical dual crank mechanism, persons skilled in the art will recognize that variations on these embodiments, constituting other embodiments, are within the scope and spirit of the innovation.

The invention claimed is:

1. A compound crank engine system, comprising:
   i) an opposed-piston engine comprising at least one cylinder, each of the at least one cylinders having two ends and housing a first piston and a second piston opposed to the first piston, each piston affixed to a piston rod extending from each end of each of the at least one cylinders, the first piston capable of reciprocal motion with the second piston within the at least one cylinder, said first piston having an outer dead center ODC_L and an inner dead center IDC_L disposed along the at least one cylinder, said second piston having an outer dead center ODC_R and an inner dead center IDC_R disposed along the at least one cylinder;
   ii) a single crank mechanism coupled to the first piston of the opposed piston pair housed in each of the at least one cylinder of the opposed piston engine, wherein the single-crank mechanism comprises:
      a) a crankshaft;
      b) at least one crank arm member having a first end and a second end, the first end affixed to the crankshaft; and
      c) a linkage member having a first end and a second end, the first end pivotally affixed to the second end of the crank arm member, and the second end pivotally affixed to the piston rod affixed to the first piston;
   and
   iii) a dual crank mechanism coupled to the second piston of the opposed piston pair housed in each of the at least one cylinder of the opposed piston engine, wherein the dual crank mechanism comprises:
      a) a first crankshaft having a first crank angle;
      b) a second crankshaft having a second crank angle;
      c) a first crank arm member affixed to the first crankshaft;
      d) a second crank arm member having a first end and a second end, the first end affixed to the second crankshaft;
      e) a first linkage member having a first end and a second end, the first end of the linkage member pivotally affixed to the second end of the first crank arm member; and
      f) a second linkage member having a first end and a second end, the first end pivotally affixed to the second end of the second crank arm member;
   wherein a first crankshaft axis is laterally offset from an axis of the at least one cylinder by at least a length of the first crank arm member, and a second crankshaft axis is laterally offset from an axis of the at least one cylinder by at least a length of the second crank arm member, and wherein the second end of the first linkage member and the second end of the second linkage member are pivotally affixed to the piston rod of the second piston.

2. The compound crank engine system of claim 1, wherein the opposed piston engine further comprises:
(i) at least one external combustion chamber positioned substantially near the center of the at least one cylinder and integral therewith, said at least one external combustion chamber having one or more exit orifices in communication with an interior of the at least one cylinder; and (ii) one or more exhaust ports disposed on a wall of the cylinder between the at least one external combustion chamber and at least one of the two ends of the at least one cylinder.

3. The compound crank engine system of claim 2, wherein the first piston is displaced to the inner dead center (IDL_L) of the first piston when the crank arm member is collinear with the linkage member of the single crank mechanism and coaxial with the at least one cylinder, said inner dead center of the first piston being disposed along the at least one cylinder between the external combustion chamber and the one end of the two ends of the at least one cylinder through which the piston rod of the second piston extends such that the exit orifice of the at least one external combustion chamber is covered by the first piston.

4. The compound crank engine system of claim 2, wherein the inner dead center of the second piston (IDC_R) is disposed along the at least one cylinder between the external combustion chamber and the one or more exhaust ports disposed between the external combustion chamber and the one of the two ends of the cylinder through which the piston rod of the second piston extends.

5. The compound crank engine system of claim 2, wherein the one or more exhaust ports are disposed along the at least one cylinder between the one or more external combustion chambers and the outer dead center for the first piston (ODC_L) and the outer dead center for the second piston (ODC_R).

6. The compound crank engine system of claim 1, wherein the ratio of the length of the linkage arm members to the length of the crank arm members of the dual crank mechanism is greater than 1, such that the first piston arrives at the inner dead center IDC_L position before the second piston arrives at the inner dead center IDC_R position during each cycle of the reciprocal motion of the first piston with the second piston within the at least one cylinder.

* * * * *